(12) United States Patent
Auday et al.

(10) Patent No.: US 8,120,236 B2
(45) Date of Patent: Feb. 21, 2012

(54) LIGHT-EMITTING STRUCTURE HAVING LEAKAGE CURRENT LIMITED BY AN ELECTRICAL CONDUCTOR WITH AN ADJUSTABLE FREQUENCY AND AN ADJUSTABLE POTENTIAL

(75) Inventors: Guillaume Auday, Bussiere-Saint-Georges (FR); Aude Montgermont, Compiegne (FR); Jingwei Zhang, Massy (FR); Didier Duron, Boulogne Billancourt (FR)

(73) Assignee: Saint-Gobain Glass France, Courbevoie (FR)

( * ) Notice: Subject to any disclaimer, the term of this patent is extended or adjusted under 35 U.S.C. 154(b) by 280 days.

(21) Appl. No.: 12/438,371

(22) PCT Filed: Jul. 25, 2007

(86) PCT No.: PCT/FR2007/051719
§ 371 (c)(1),
(2), (4) Date: Feb. 23, 2009

(87) PCT Pub. No.: WO2008/023124
PCT Pub. Date: Feb. 28, 2008

(65) Prior Publication Data
US 2009/0322202 A1 Dec. 31, 2009

(30) Foreign Application Priority Data
Aug. 21, 2006 (FR) ...................................... 06 53414

(51) Int. Cl.
*H01J 11/00* (2006.01)
*H01J 65/00* (2006.01)
*H01J 1/62* (2006.01)
*H01J 63/04* (2006.01)

(52) U.S. Cl. ...................................... 313/484; 313/234

(58) Field of Classification Search .................. None
See application file for complete search history.

(56) References Cited

U.S. PATENT DOCUMENTS
3,999,057 A  12/1976 Hamacher
(Continued)

FOREIGN PATENT DOCUMENTS
CH         473 354        5/1969
(Continued)

OTHER PUBLICATIONS
U.S. Appl. No. 12/596,069, filed Oct. 15, 2009, Auday, et al.
(Continued)

*Primary Examiner* — Toan Ton
*Assistant Examiner* — Britt D Hanley
(74) *Attorney, Agent, or Firm* — Oblon, Spivak, McClelland, Maier & Neustadt, L.L.P.

(57) ABSTRACT

A flat or substantially flat light-emitting and/or UV (ultraviolet)-emitting structure including first and second dielectric walls facing each other and defining an internal space containing a light source, first and second electrodes for the light source, which generate electric field lines with at least one component perpendicular to the first and second electrodes, the first electrode being supplied or capable of being supplied by a high-frequency electromagnetic signal $f_0$, and as an outer cover for the first electrode, an electrical safety system that includes an electrical conductor separated from the first electrode by a dielectric, the protective conductor being connected or capable of being connected to an electrical power supply with a potential V and/or with a frequency f that are adjusted so that the peak value of external leakage current is equal to 2 mA or less if f is zero, or 0.7 mA or less if f is non-zero.

20 Claims, 10 Drawing Sheets

U.S. PATENT DOCUMENTS

| | | | | |
|---|---|---|---|---|
| 5,319,282 A | * | 6/1994 | Winsor | 315/169.4 |
| 5,702,179 A | | 12/1997 | Sidwell et al. | |
| 2002/0050321 A1 | | 5/2002 | Tone et al. | |
| 2006/0091807 A1 | | 5/2006 | Bertin-Mourot et al. | |

FOREIGN PATENT DOCUMENTS

| | | |
|---|---|---|
| EP | 0 348 979 | 1/1990 |
| EP | 0 767 340 | 4/1997 |
| EP | 1 180 781 | 2/2002 |
| JP | 6 349450 | 12/1994 |
| JP | 7 288102 | 10/1995 |
| JP | 2003 107463 | 4/2003 |

OTHER PUBLICATIONS

U.S. Appl. No. 12/596,305, filed Oct. 16, 2009, Joulaud, et al.

* cited by examiner

LIGHT-EMITTING STRUCTURE HAVING LEAKAGE CURRENT LIMITED BY AN ELECTRICAL CONDUCTOR WITH AN ADJUSTABLE FREQUENCY AND AN ADJUSTABLE POTENTIAL

The invention relates to the field of light-emitting and/or UV-emitting structures and more particularly to a substantially flat light-emitting and/or UV-emitting structure with first and second dielectric walls facing each other and defining an internal space containing a light and/or UV source, first and second electrodes for the light or UV source which generate electric field lines with at least one component perpendicular to the first and second electrodes, the first electrode being at least supplied or capable of being supplied with a high-frequency electromagnetic signal.

Included among known flat light-emitting structures are flat lamps that can be used as a decorative or architectural luminaire or for liquid-crystal screen backlighting. These flat lamps typically consist of two glass sheets held together with a small gap of generally less than a few millimeters between them, and are hermetically sealed so as to contain a gas at reduced pressure in which an electrical discharge produces radiation, generally in the ultraviolet range, this radiation exciting a photoluminescent material which then emits visible light.

Document WO 2004/015739 A2 thus discloses a flat discharge lamp that comprises:
- two walls in the form of glass sheets held together so as to be mutually parallel and defining an internal gas-filled space, those faces of the glass sheets that are turned towards the internal space being coated with a photoluminescent material excited by the plasma gas;
- two electrodes in the form of a uniform layer covering respectively the two walls to the outside of the internal space, these electrodes thus generating electric field lines with at least one component perpendicular to the electrodes; and
- two glass sheets joined to the walls via plastic interlayer films.

To supply this type of flat lamp, at least one of the electrodes is at an AC potential $V_0$ typically of the order of kV, and at high frequency, typically of the order of 1 to 100 kHz, and for example with a power of about 100 W.

The Applicant has found that the insulation capacity of the laminating glass/plastic film assembly is unsatisfactory. In particular, it has found a safety problem with this flat lamp of the prior art whenever a highly conducting body, for example a metal body, comes close to the laminated glass in relation with the high-frequency supplied electrode.

Thus, the object of the present invention is to propose a flat or substantially flat light-emitting structure, with a high-frequency supply and with an electric field having a vertical component, which structure is safety-enhanced while avoiding considerably increasing the power consumed in the structure.

For this purpose, the present invention provides a light-emitting or UV (ultraviolet)-emitting structure:
- having first and second dielectric walls with plane main faces facing each other and defining an internal space containing a light and/or UV source; and
- with first and second electrodes for the light source, which generate electric field lines with at least one component perpendicular to the first and second electrodes, the first and second electrodes being associated with the first and second walls respectively, the first electrode being supplied or capable of being supplied by a high-frequency electromagnetic signal of frequency $f_0$.

This light-emitting or UV-emitting structure according to the invention further includes, as outer cover for the first electrode, an electrical safety system that comprises an electrical conductor called protective conductor, separated from the first electrode by a dielectric, called interlayer dielectric, which is substantially flat and of given capacitance C, said protective conductor being connected or capable of being connected to an electrical power supply with a potential V and/or with a frequency f that are adjusted so that the peak value of the external leakage current is equal to 2 mA or less if f is zero, or 0.7 mA or less if f is non-zero.

The interlayer dielectric and/or the protective conductor and/or one of the electrodes is/are chosen in such a way that the power consumed $P_d$ at the terminals of the interlayer dielectric is equal to or less than 0.35 times the power P delivered by the electrical power supply at least at a surface temperature of the structure chosen between 25° C. and 60° C.

$P_d$ is given by the following formula: $P_d = 2\pi f_0 C U^2 \sin \delta$ in which $\delta$ is the loss angle of the interlayer dielectric and U is the voltage across the terminals of the interlayer dielectric.

In the structure of the prior art, the leakage current is high as it is proportional to the (active area of the first electrode/area of the metal body) ratio, to the high frequency, to a high potential and to the power consumed by the lamp.

In the structure according to the invention, the leakage current is limited by adjusting the frequency f and/or the potential V of the electrical conductor in order for the light-emitting or UV-emitting structure to be made safe.

The potential V and the frequency f or the product V.f, to be applied to the electrical conductor according to the invention are lower the higher the area ratio and in general the larger the size of the lamp.

To measure the leakage current, a metal body preferably having an area equal to that of the first electrode (the most drastic condition) will be chosen. For a metal object with an area less than that of the electrode, the current is reduced proportionally.

The power may be preferably of the order of 100 W if V is an AC voltage, or even up to 1 kW if V is a DC or zero voltage.

The structure may have a size corresponding to an area of 0.1 m² or more.

The dielectric between the first electrode and the protective electrical conductor is a capacitive interlayer introducing a capacitance C in parallel with the given capacitance C' of the lamp before the discharge, C' being defined by the dielectric(s) between the two electrodes (gas, dielectric wall(s), etc.). The interlayer has an influence on the supply for the lamp and therefore on its performance. In particular, the energy that it consumes also varies with the temperature of the lamp. Thus, it is necessary to limit $P_d$, preferably by reducing the product C sin δ.

Preferably, $P_d$ may be equal to or less than 0.25 P, or even 0.15 P for said surface temperature, or even for a surface temperature range between 30° C. and 60° C., even more preferably between 20° C. and 80° C., or even between −10° C. and 100° C. (extreme operating conditions).

Since the capacitive interlayer is defined by its loss angle δ and introduces a capacitance C proportional to the relative permittivity $\in_r$, to limit the product C sin δ, the interlayer dielectric may be chosen with suitable electrical properties, that is to say a low tan δ and/or a low relative permittivity $\in_r$, one or both of these parameters preferably being constant with temperature.

To do this, it may be advantageous to choose:

a tan δ equal to or less than 0.06, or even 0.03 for a frequency $f_0$ between 1 and 100 kHz and at said surface temperature, or even for a surface temperature range between 30° C. and 60° C., and even more preferably between 20° C. and 80° C., or even between 0° C. and 100° C.; and/or a relative permittivity $\in_r$ equal to or less than 4.5, or even 4, or even 3.5 for a frequency $f_0$ between 1 and 100 kHz at said surface temperature, or even for a surface temperature range between 30° C. and 60° C., more preferably between 20° C. and 80° C. or even between 0° C. and 100° C.

This is because when the temperature of the structure rises, the power $P_d$ also rises, since the loss angle δ increases. It is thus advantageous to use an interlayer dielectric that changes little, from an electrical standpoint, with temperature, particularly between 30° C. and 80° C.

To reduce the capacitance C, it is also possible, instead of, but preferably in addition to the choices of the aforementioned electrical parameters:

to reduce the area of the protective electrical conductor and/or of one or both electrodes, preferably by choosing a grid or mutually parallel conducting wires or tracks that are parallel or organized in a grid, or else any other conducting network, and/or to reduce the area of the interlayer dielectric or particularly the area(s) facing the protective electrical conductor, the electrodes and the interlayer dielectric; and/or optionally to increase the thickness of the interlayer dielectric.

The dielectric may have other advantageous properties:

satisfactory thermomechanical properties (possible lamination, good temperature resistance, etc.);

satisfactory optical properties (transparency, etc.);

a low density (to limit the total weight of the structure); and a reasonable cost.

Preferably, the dielectric may comprise or consist of one of the following elements:

a glass element such as a glass sheet which may be one of the walls and which may be chosen from:

a thick soda-lime-silica glass with a minimum thickness of about 7 mm in the full-area configuration, a soda-lime-silica glass with at least 0.05% $Fe^{III}$ or $Fe_2O_3$, for example with a thickness of from 6 mm in the full-area configuration, a borosilicate glass, for example with a thickness of from 5 mm in the full-area configuration, and a silica or a quartz, for example with a thickness of from 3 mm in the full-area configuration;

a film of polymer material, for example:

a polyethylene terephthalate (PET), a polyvinyl butyral (PVB), a polyurethane (PU), polyethylene (PE), polyethylene naphthalate (PEN), polyvinyl chloride (PVC) or acrylates, such as polymethyl methacrylate (PMMA), these materials having a minimum thickness of 5 mm in the full-area configuration (i.e. covering substantially the entire associated main face, for example at least 80% of this face) or most particularly an ethylene/vinyl acetate (EVA) copolymer, having a minimum thickness of 3 mm in the full-area configuration, or a polycarbonate (PC) having for example a minimum thickness of 2 mm in the full-area configuration; and a gas, such as air, with a minimum thickness of 1 mm, or an inert gas with a minimum thickness of 2 mm, such as argon or xenon, preferably at a high pressure so as to be difficult to ionize, or else such as nitrogen.

The interlayer dielectric may be a composite dielectric. It may comprise or consist of a stack of several of the aforementioned elements, preferably with thicknesses of less than the optionally proposed minimum thicknesses, most particularly:

at least two of said polymer films, especially an EVA film and a PC film;

a gas and at least one polymer film, especially the EVA film and/or PC film;

a gas and said glass sheet, which is preferably thinner, for example with a thickness equal to or less than 4 mm or 3 mm in the case of a soda-lime-silica glass.

It is also conceivable to produce an interlayer dielectric with apertures (for example through-holes) or even to be in discontinuous form, in particular a plurality of preferably parallel, equidistant and uniformly distributed strips, or a plurality of sections of any other shape. The interlayer dielectric may be one of the aforementioned glass sheets and/or one or more of the aforementioned polymer (PVB, PU, PET, EVA, PEN, PVC, PC, PMMA, etc.) films preferably with a thickness of less than the optionally proposed minimum thickness.

The invention applies to any light-emitting and/or UV-emitting structure supplied with high frequency and with a field E having a vertical component (at least two non-coplanar electrodes) preferably to any type of discharge-type light source, that is to say one with a plasma gas emitting in the visible and/or the UV, or with a phosphor emitting in the visible when excited by a plasma gas.

The structure may be a monodirectionally and/or bidirectionally illuminating (UV) lamp, a lamp for decoration, or a lamp for display screens (liquid crystal, television, monitor, etc.) backlighting.

Monodirectional illumination is useful for example for illuminating tiles or for LCD screen backlighting.

Furthermore, the luminous structure emitting in the visible may form an integral part of a double-glazing unit as a replacement for one of the glass panes of the unit, or being associated with, for example incorporated in, the double-glazing unit.

Of course, in the case of bidirectional illumination, all the elements directed more to the outside than the light source of the structure are, over a common portion, substantially or completely transparent to radiation in the visible and/or in the UV (for example in the form of an arrangement of absorbent or reflecting patterns that are distributed so as to let a sufficient amount of the emitted light and/or UV pass through them).

In the visible range, the invention is aimed for example at the production of illuminating architectural or decorative elements and/or elements having a display function (luminous indicating elements, logos or marks), such as especially flat luminaires, especially suspended luminous walls, luminous tiles, etc.

The light-emitting structure chosen forms an illuminating window for buildings or means of locomotion, for example a train window or a ship or aircraft cabin window, a roof, side window, rear window or windscreen of industrial vehicles, glazing, an internal partition between two rooms or between two compartments of land, air or maritime means of locomotion, a display case or shop window, urban furniture, a building façade.

A dielectric material transmitting UV radiation (a material for one or more walls and/or the interlayer dielectric and/or the covering dielectric) may be preferably chosen from quartz, silica, magnesium fluoride ($MgF_2$) or calcium fluoride ($CaF_2$), a borosilicate glass or a glass containing less than 0.05% $Fe_2O_3$.

To give examples, for thicknesses of 3 mm:
magnesium or calcium fluorides transmit more than 80%, or even 906, over the entire range of UV bands, that is to say UVA (between 315 and 380 nm), UVB (between about 280 and 315 nm), UVC (between 200 and 280 nm) and VUV (between about 10 and 200 nm);
quartz and certain high-purity silicas transmit more than 80%, or even 90%, over the entire range of UVA, UVB and UVC bands;
borosilicate glass, such as Borofloat from Schott, transmits more than 70% over the entire UVA band; and
soda-lime-silica glass with less than 0.05% Fe(III) or $Fe_2O_3$, especially the glass Diamant® from Saint-Gobain, the glass Optiwhite® from Pilkington, and the glass B270 from Schott, transmits more than 70% or even 80% over the entire UVA band.

However, a soda-lime-silica glass, such as the glass Planilux® sold by Saint-Gobain, has a transmission of more than 80% above 360 nm, which may be sufficient for certain constructions and certain applications.

In the structure of the flat lamp according to the invention, the gas pressure in the internal space may be around 0.05 to 1 bar. A gas or a gas mixture is used, for example a gas that efficiently emits said UV radiation, especially xenon, or mercury or halides, and an easily ionizable gas capable of forming a plasma (plasma gas), such as a rare gas like neon, xenon or argon or even helium, or halogens, or even air or nitrogen.

The halogen content (when the halogen is mixed with one or more rare gases) is chosen to be less than 10%, for example 4%. It is also possible to use halogenated compounds. The rare gases and the halogens have the advantage of being insensitive to the environmental conditions.

Table 1 below indicates the radiation peaks of the particularly effective UV-emitting gases.

TABLE 1

| UV-emitting gas(es) | Peak(s) (in nm) |
|---|---|
| Xe | 172 |
| $F_2$ | 158 |
| $Br_2$ | 269 |
| C | 259 |
| $I_2$ | 342 |
| XeI/KrI | 253 |
| ArBr/KrBr/XeBr | 308/207/283 |
| ArF/KrF/XeF | 351/249/351 |
| ArCl/KrCl/XeCl | 351/222/308 |
| Hg | 185, 254, 310, 366 |

The UV lamp as described above may be used both in the industrial sector, for example in the beauty, biomedical, electronics or food fields, and in the domestic sector, for example for decontaminating air or tap water, drinking water or swimming pool water, for UV drying or for UV curing.

By choosing radiation in the UVA or even in the UVB, the UV lamp as described above may be used:
as a tanning lamp (especially 99.3% in the UVA and 0.7% in the UVB according to the standards in force);
for dermatological treatments (especially radiation in the UVA at 308 nm);
for photochemical activation processes, for example for curing, especially of adhesives, or crosslinking or for drying paper;
for the activation of fluorescent material, such as ethidium bromide used in gel form, for analyzing nucleic acids or proteins; and
for activating a photocatalytic material, for example for reducing odors in a refrigerator or dirt.

By choosing radiation in the UVB, the lamp promotes the formation of vitamin D in the skin.

By choosing radiation in the UVC, the UV lamp as described above may be used for disinfecting/sterilizing air, water or surfaces, by a germicide effect, especially between 250 nm and 260 nm.

By choosing radiation in the far UVC or preferably in the VUV for ozone production, the UV lamp as described above is used especially for the treatment of surfaces, in particular before the deposition of active films for electronics, computing, optics, semiconductors, etc.

The UV lamp may be incorporated for example into domestic electrical equipment such as a refrigerator or into a kitchen worktop.

The UV lamp may have dimensions of the order of those currently reached with fluorescent tubes, or even greater, for example with an area of at least 0.1 $m^2$ or even 1 $m^2$.

Preferably, the transmission factor of the lamp according to the invention around the peak of said visible or UV radiation is 50% or higher, even more preferably 70% or higher and even 80% or higher.

In a UV lamp configuration with only one face of an element transmitting the UV, the other wall may be opaque, for example made of a glass-ceramic or even a non-glass dielectric, preferably with a similar expansion coefficient.

The structure may include a material that reflects the UV or visible radiation, the material partly or entirely covering an internal or external face of one of the walls, for example aluminium or alumina. One of the electrodes may be made of said reflecting material. This material may also protect any polymer material present in the structure from UV radiation, thus preventing it from ageing or yellowing.

When the electrodes are on the internal main faces, the interlayer dielectric may comprise or be one of the walls.

The first and second electrodes may alternatively be at least partly in the first and second walls or on their external main faces, this being most particularly the case for a structure with walls made of a conventional soda-lime-silica glass, thus retaining a wider choice of interlayer dielectric.

When assembling the structure, the first electrode will preferably be placed on the less accessible side, for example the floor side in the case of a tile.

The protective electrical conductor may be a continuous layer or, in particular to reduce C, it may be a discontinuous layer (for example in strip form) or it may be a grid or wires.

In one embodiment, the potential B is earth potential.

Thus, the structure is completely isolated, the protective electrical conductor acting as a screen—the leakage current is zero.

Preferably, the second electrode may be connected to an earth and more preferably the protective electrical conductor and the second electrode are optionally connected to the same point in the supply circuit for the light or UV source.

In this latter embodiment, the protective electrical conductor is for example a layer deposited on the interlayer dielectric (optionally on one of the walls if the electrodes are internal) for optimum compactness and manufacturing simplicity. This layer may be protected from scratches by a laminated glass counter-pane and/or film, which also prevents the conductor being torn off.

If the electrodes are external, the protective electrical conductor may also be a layer deposited on an internal or external face of an additional outer dielectric substrate, for example a laminated glass counter-pane for greater strength.

If the electrodes are on the internal main faces, a reinforced glass sheet may include the protective electrical conductor in the form of a grid. Such a structure remains compact and strong.

As a variant, the potential V may also be a DC potential, for example equal to 12 V, 24 V or 48 V, and in particular of unlimited value if an insulator of the above glass type is provided.

In one embodiment, the electrodes are placed on the external faces and the protective electrical system includes another covering dielectric (other than air) lying on top of the protective electrical conductor, and the potential V is 400V or less, preferably 220 V or less and even more preferably 110 V or less and/or the frequency f is 100 Hz or less, preferably 60 Hz or less and even more preferably 50 Hz or less.

Furthermore, the potential and the frequency for the second electrode are substantially the same, in order to facilitate the construction.

The potential V is preferably 220 V or less and the frequency f is preferably 50 Hz or less.

This covering dielectric may comprise a glass sheet preferably with a thickness of 4 mm or less, in order to avoid an excessive thickness and/or an excessive weight and also for cost reasons.

Of course, the smaller the thickness of the covering dielectric, the more the potential V and/or the frequency f have to be limited.

Since the second electrode may also be supplied or be capable of being supplied by a high-frequency signal, the light emitting structure may preferably include another electrical safety system, for example one similar to the electrical safety system described above. In this configuration, the interlayer dielectric is duplicated, that is to say made up of two parts each as external cover for a separate electrode. The consumed power $P_d$ then corresponds to the sum of the powers at the terminals of the two parts.

The two interlayer parts may preferably be similar or identical (in terms of material, thickness, shape), in particular the aforementioned elements (glass sheet, polymer film, gas, or combinations thereof).

Furthermore, the electrical protection system may form part of an electrically controllable device, preferably one having variable optical properties, such as an electrochromic device or a device having a switchable reflecting or transparent surface.

Moreover, one or both electrodes (and/or the protective electrical conductor(s)) may be based on a material that transmits UV radiation.

An electrically conducting material transmitting UV radiation may be a very thin layer of gold, for example with a thickness of the order of 10 nm, or of alkali metals such as potassium, rubidium, caesium, lithium or potassium, for example with a thickness of 0.1 to 1 μm, or else it may be an alloy thereof, for example with 25% sodium and 75% potassium.

The electrodes (and/or the protective electrical conductor or conductors) may be in the form of layers. The electrodes may cover all or part of the internal or external faces facing the walls. It is possible to provide only certain areas of the surface of one or more walls with such electrode layers so as to create on the same surface predefined luminous zones.

These layers may consist of any conducting material capable of being formed as a flat element allowing light or UV to pass through it, especially one that can be deposited as a thin layer on glass or on a plastic film, such as PET film. It may be preferred to form a coating from a conducting metal oxide or a metal oxide having electronic vacancies, such as fluorine-doped tin oxide or indium tin mixed oxide.

The electrodes may be linear strips or of more complex, non-linear, form, for example angled, V-shaped, corrugated or zigzagged, the spacing between electrodes being kept substantially constant.

The electrodes in strip form may be solid electrodes, especially formed from contiguous conducting wires (which are parallel, or braided, etc.) or from a tape (made of copper, to be bonded, etc.) or from a coating deposited by any means known to those skilled in the art, such as liquid-phase deposition, vacuum deposition (magnetron sputtering, evaporation), by pyrolysis (in powder or gas phase), or by screen printing.

To form strips in particular, it is possible to employ masking systems in order to obtain the desired distribution directly, or else to etch a uniform coating by laser ablation or by chemical or mechanical etching.

For example, the layers may be in the form of an array of solid parallel strips or organized in the form of a grid, with a strip width between 3 and 15 mm and a non-conducting space between two adjacent strips which is wider than the width of the strips. These strips may be offset by 180° so as to prevent two opposed conducting strips on the two walls facing each other. Advantageously, this reduces the effective capacitance of the walls, reducing the power supply for the structure and increasing its efficiency in terms of lumens/W.

The electrodes (and/or the protective electrical conductor or conductors) may be in the form of grids of wires, for example incorporated at least partly into the respective walls or into outer dielectrics.

Finally, the electrodes may be in the form of parallel wires, for example incorporated at least partly into the walls or into outer dielectrics.

As non-transparent electrode material, it is possible to use for example a metallic material such as tungsten, copper or nickel.

One or both electrodes (and/or the protective electrical conductor or conductors) may be suitable for overall transmission of said UV or visible radiation (if the material is absorbent or reflecting with respect to UV and/or light).

The electrodes (and/or the protective electrical conductor or conductors) may be substantially parallel strips having a width l1 and being spaced apart by a distance d1, it being possible for the l1/d1 ratio to be between 10% and 50%, in order to allow an overall UV or visible transmission of at least 50% on the side with the electrodes, it also being possible for the l1/d1 ratio to be adjusted according to the transmission of the associated wall.

The electrodes (and/or the protective electrical conductor or conductors) may also each be in the form of an array of essentially elongate conducting patterns such as conducting lines (which can be likened to very thin strips) or actual conducting wires, it being possible for these patterns to be substantially straight or corrugated, or zigzagged, etc. This array may be defined by a given pitch called p1 (the minimum pitch in the case of a number of pitches) between patterned elements and a width called L2 of patterned elements (this being the maximum width in the case of a number of widths). Two series of patterned elements may be crossed. This array may especially be organized as a grid, such as a fabric, cloth, etc.

Thus, it is possible to obtain complete transparency to UV or to visible light by adapting the l1/d1 ratio according to the desired transparency, as already described and/or by using the array of conducting patterns and by adapting the width l2 and/or the pitch p1 according to the desired transparency.

Thus, the width l2/pitch p1 ratio may preferably be equal to 50% or less, preferably 10% or less and even more preferably 1% or less.

For example, the pitch p1 may be between 5 µm and 2 cm, preferably between 50 µm and 1.5 cm and even more preferably between 100 µm and 1 cm, and the width l2 may be between 1 µm and 1 mm, preferably between 10 and 50 µm.

As examples, it is possible to use a conducting array (in the form of a grid, etc.) on a glass sheet or on a plastic sheet, for example of PET type, with a pitch p1 of between 100 µm and 300 µm and a width l2 of 10 to 20 µm, or else an array of conducting wires at least partly incorporated into a laminating interlayer, with a pitch p1 of between 1 and 10 mm, especially 3 mm, and a width l2 of between 10 and 50 µm, especially between 20 and 30 µm.

It may also be advantageous to incorporate into the structure a coating having a given functionality. This may be a coating having the function of blocking radiation with wavelengths in the infrared (for example using one or more silver layers surrounded by dielectric layers, or nitride layers such as TiN or ZrN, metal oxide layers, or layers made of steel or Ni—Cr alloy), having a low-emissivity function (for example made of a doped metal oxide, such as $SnO_2$:F or tin-doped indium oxide ITO, or one or more silver layers), having an anti-fogging function (by means of a hydrophilic layer), or having an anti-fouling function (photocatalytic coating comprising $TiO_2$ at least partly crystallized in anatase form), or else an antireflection multilayer, for example of the $Si_3N_4$/$SiO_2$/$Si_3N_4$/$SiO_2$ type.

The protective electrical conductor in the form of a layer may also have a low-emissivity or solar-control function.

The electrical protection system, with or without its power supply, and that part of the structure forming the flat lamp, with or without its power supply, may form a monolithic assembly or may even be integrated, that is to say it may have an element in common and/or a common electrical power supply.

The electrical protection system and that part of the structure forming the flat (UV) lamp may also be provided separately, sold in kit form and ready to be assembled.

Further details and features of the invention will become apparent from the following detailed description, in conjunction with the appended drawings in which.

It should be pointed out that, for the sake of clarity, the various elements of the objects shown are not necessarily drawn to scale.

Figure 1:
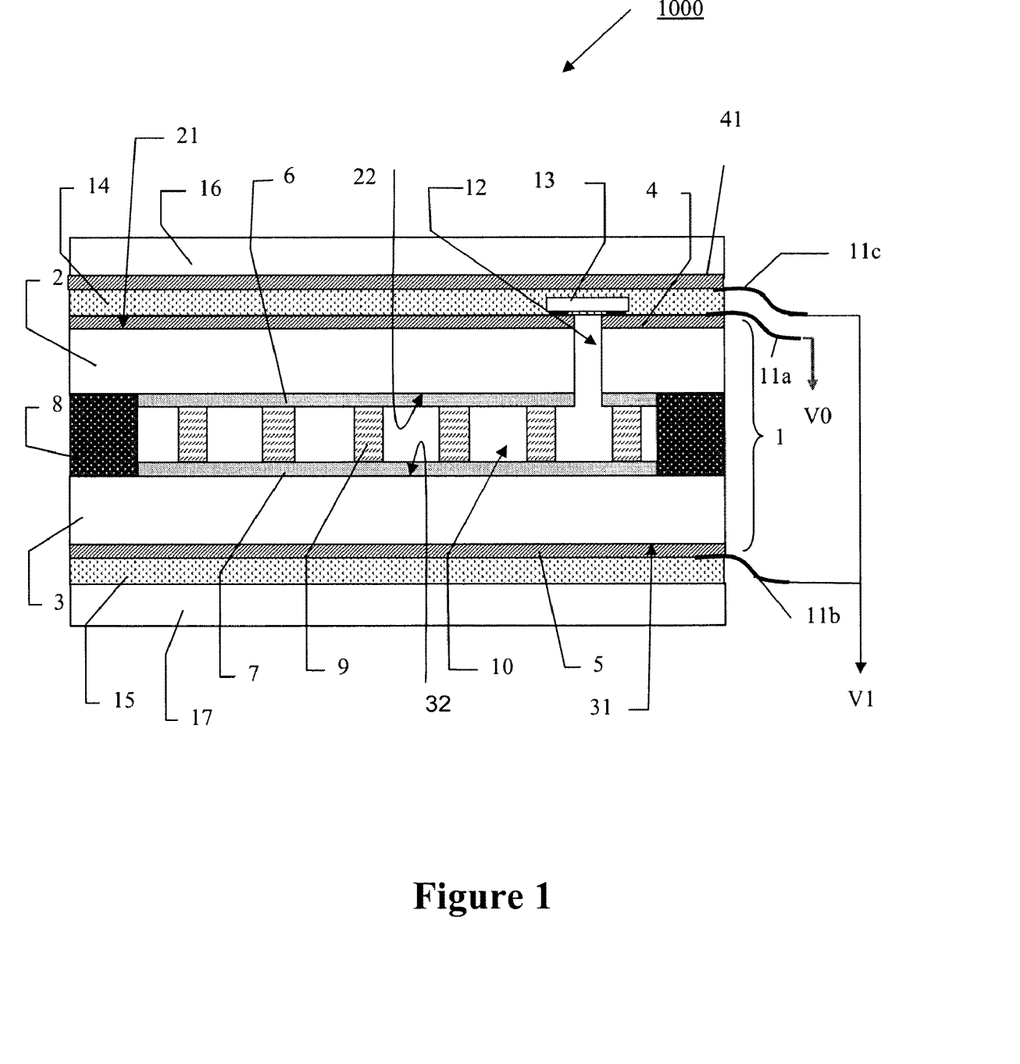
FIG. 1 shows a sectional schematic view of a safety-enhanced flat lamp according to the invention.

FIG. 1 shows a flat lamp 1000 consisting of a part 1 formed by two substrates made of glass sheets 2, 3, for example about 4 mm in thickness, having an external main face 21, 31 or first face, associated with which is a preferably continuous and homogeneous conductive coating 4, 5 constituting an electrode, and an internal main face 22, 32, or second face, which bears a coating of photoluminescent material 6, 7, for example a transparent coating, for example in the form of phosphor particles dispersed in an inorganic matrix, for example one based on lithium silicate.

The sheets 2, 3 are joined together with their second faces 22, 32 bearing the photoluminescent material 6, 7 facing each other and are joined together by means of a sealing frit 8, the gap between the glass sheets being imposed (with a value generally less than 5 mm) by glass spacers 9 placed between the sheets. Here, the gap is around 0.3 to 5 mm, for example from 0.4 to 2 mm.

The spacers 9 may have a spherical, cylindrical or cubic shape or any other polygonal, for example cruciform, cross section. The spacers may be coated, at least on their lateral surface exposed to the plasma gas atmosphere, with a phosphor identical to or different from the phosphor 6, 7.

A reduced pressure, in general of the order of one tenth of an atmosphere, of a rare gas such as xenon optionally mixed with neon or with helium, is obtained in a space, called the internal space 10, between the glass sheets 2, 3.

Each electrode is deposited directly on the external face 21, 31 of the substrate 2, 3. Each electrode 4, 5 is for example a layer of fluorine-doped tin oxide.

As a variant, each electrode may be associated with the substrate in various ways: it may be deposited on the external or internal face of an element bearing an electrical insulator, this insulator-bearing element being joined to the substrate so that the coating is pressed against the external face 21, 31 of the substrate. This element may for example be a plastic film of the EVA or PVB type, or several plastic films, for example PET, PVB and PU films.

Each electrode may also be in the form of a metal grid incorporated into a plastic film or even into the substrate, which then forms a reinforced glass, or else in the form of mutually parallel wires.

Each electrode may also be sandwiched between a first electrical insulator and a second electrical insulator, these being joined to the substrate 2, 3. The electrode may for example be inserted between two plastic sheets.

Another combination of electrical insulators is the following: a PVB sheet is taken as first electrical insulator, which will be used to bond the second electrical insulator bearing the electrode, such as a PET sheet, the electrode being between the PVB sheet and the PET sheet.

The electrode 4 is connected to a high-frequency electrical power supply of frequency $f_0$ for example equal to 40 kHz via a flexible shim 11a. The electrode 4 is at a potential $V_0$ of the order of 1 kV and at the frequency $f_0$.

The smaller the thickness of the substrate 2, 3 (more generally the thickness of the dielectric(s) separating the electrodes), for example reduced to 2 or 1 mm, the lower the voltage $V_0$ has to be, therefore the more flexible are the conditions on V and f in order to guarantee insulation.

The electrode 5, supplied via a flexible shim 11b, is at a potential $V_1$ of around 220 V and at a frequency $f_1$ of 50 Hz.

Placed on top of this electrode 4 are an interlayer dielectric 14 and a protective electrical conductor 41, this being electrically supplied via a flexible shim 11c and connected to the electrode 5.

This protective conductor 41 is for example in the form of a layer of fluorine-doped tin oxide deposited entirely on the internal face of a glass sheet 16, for example with a thickness of 3.85 mm, or alternatively on a thick plastic support.

For an electrode 4 of 0.2 m² area and a power of 100 W, the leakage current measured by placing a continuous metal object of the same area on the 3.85 mm thick glass sheet 16 is about 0.6 mA (peak value).

The dielectric 14 is a capacitive laminating interlayer, for example at least one polymer film, for example identical to the film 15 placed against the electrode 5 and described below. For a surface temperature of 30° C., a frequency $f_0$ of 40 kHz, an electrode 4 of 0.2 m² area and a power P of 100 W, the power $P_d$ is:
- about 35 W if the film 14 is a PVB, PU or PET film of 5 mm thickness in order to limit the capacitance C;
- about 18 W if the film 14 is an EVA film of 3.8 mm thickness;
- about 13 W if the film 14 is a PC film combined with an EVA film (for better adhesion of the PC) of 4 mm and 1.6 mm thickness respectively; and
- about 11 W if the film 14 is replaced with 4 mm of air (using in this case one or more spacers and/or a peripheral seal) or about 5 W if it is replaced with 2 mm of air (2 mm of air is equivalent to 9 mm of PVB) and 3.15 mm of glass.

Under these conditions, the electrical permittivity $\in_r$ is:
- about 4 if the film 14 is the PVB film of 5 mm thickness; and
- about 3.5 if the film 14 is the EVA film of 3.8 mm thickness.

Under these conditions, tan δ is:
- about 0.06 if the film 14 is a PVB film of at least 5 mm thickness in order to limit the capacitance C;
- about 0.018 if the film 14 is the EVA film of 3.8 mm thickness;
- about 0.008 if the film 14 is the PC film combined with the EVA film of 4 mm and 1.6 mm thickness respectively; and
- about 0.005 if the film 14 is replaced with 4 mm of air (2 mm of air is equivalent to 9 mm of PVB) or about 0.012 if it is replaced with 2 mm of air and 3.15 mm of glass.

The voltage U across the terminals of the interlayer dielectric 14 is equal to $V_0$-$V_1$.

Placed on the outside of the external face 31 is an appropriate resin or transparent plastic film 15, for example made of PVB or EVA 1.5 mm in thickness, which serves as interlayer for lamination to a glass substrate, for example a glass sheet 17 of 3.15 mm thickness or alternatively to a thick rigid plastic support.

For an electrode 5 of 0.2 m² area and a power of 100 W, the leakage current measured by placing a continuous metal object of the same area on the 3.15 mm thick glass sheet 17 is about 0.65 mA (peak value).

If the metal object has a smaller area, the leakage current is reduced proportionally.

In a first variant relating to safety enhancement, V, is at an earth potential provided in a point in the electrical power supply circuit for the lamp, in which case the leakage current is zero.

In a second variant relating to safety enhancement, the electrode 5 and the protective electrical conductor 41 are not connected. For example, the conductor 41 remains at $V_1$, whereas the second electrode is connected either to the 220 V/50 Hz mains or to an earth.

Figure 2:
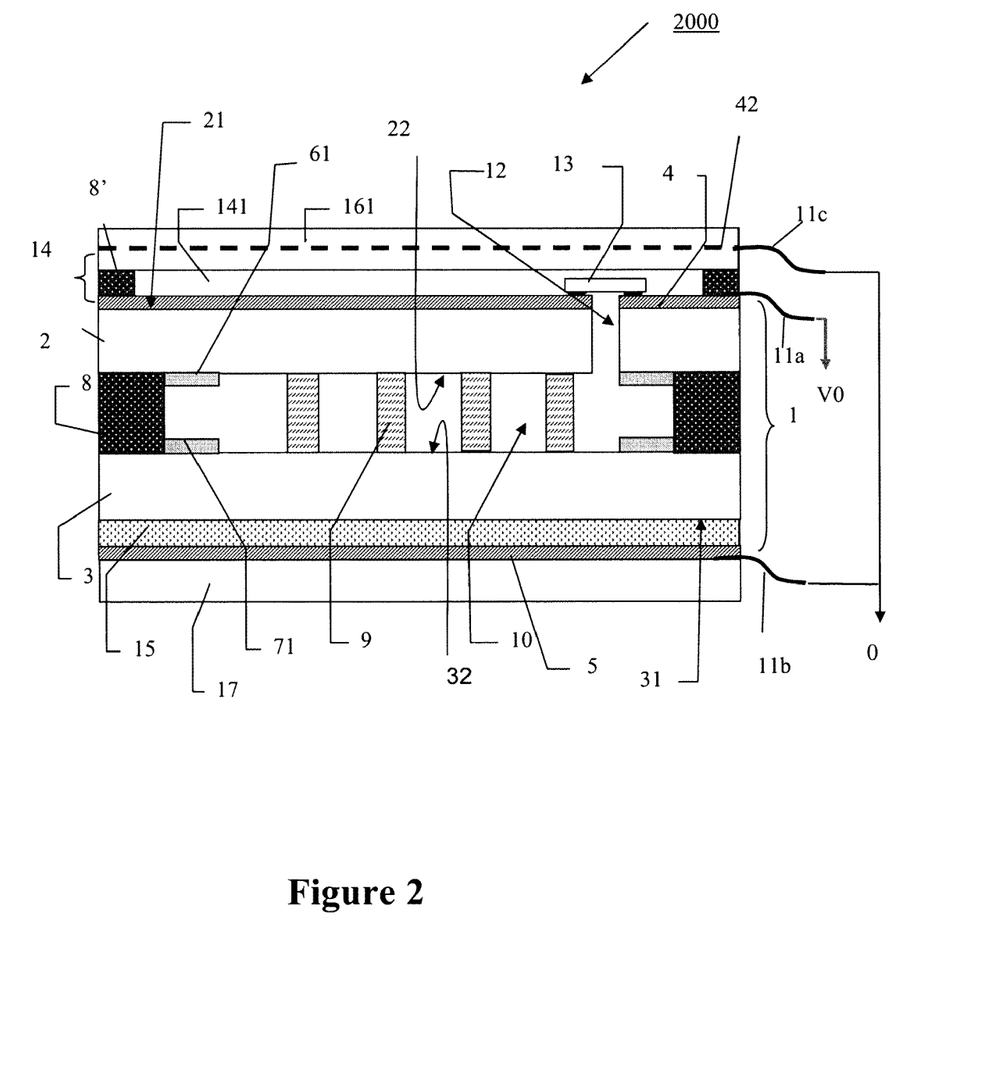
FIGS. 2 to 7 show sectional schematic views of other embodiments of flat lamps emitting in the visible or the UV and safety-enhanced according to the invention.

In the embodiment shown in FIG. 2, the structure 2000 of the lamp basically repeats the structure of FIG. 1, except for:
- the protective electrical conductor 42, which is a grid in a reinforced glass 161, the thickness of the glass on top of the electrode being for example about 3 mm;
- the arrangement of the electrode 5, which is placed on a film, for example a PET film combined with a PVB or EVA film, for joining the 3.85 mm thick glass 17; and
- the opaque photoluminescent material 61, 71 placed only on the border, for differentiated illumination.

The electrode 5 and the conductor 42 are also connected to earth. The interlayer dielectric 14 comprises a layer of gas 141, such as air or nitrogen, 2 mm in thickness (between a peripheral seal 8') and 3 mm of glass. The voltage U across the terminals of the interlayer dielectric 14 is equal to $V_0$.

Figure 3:
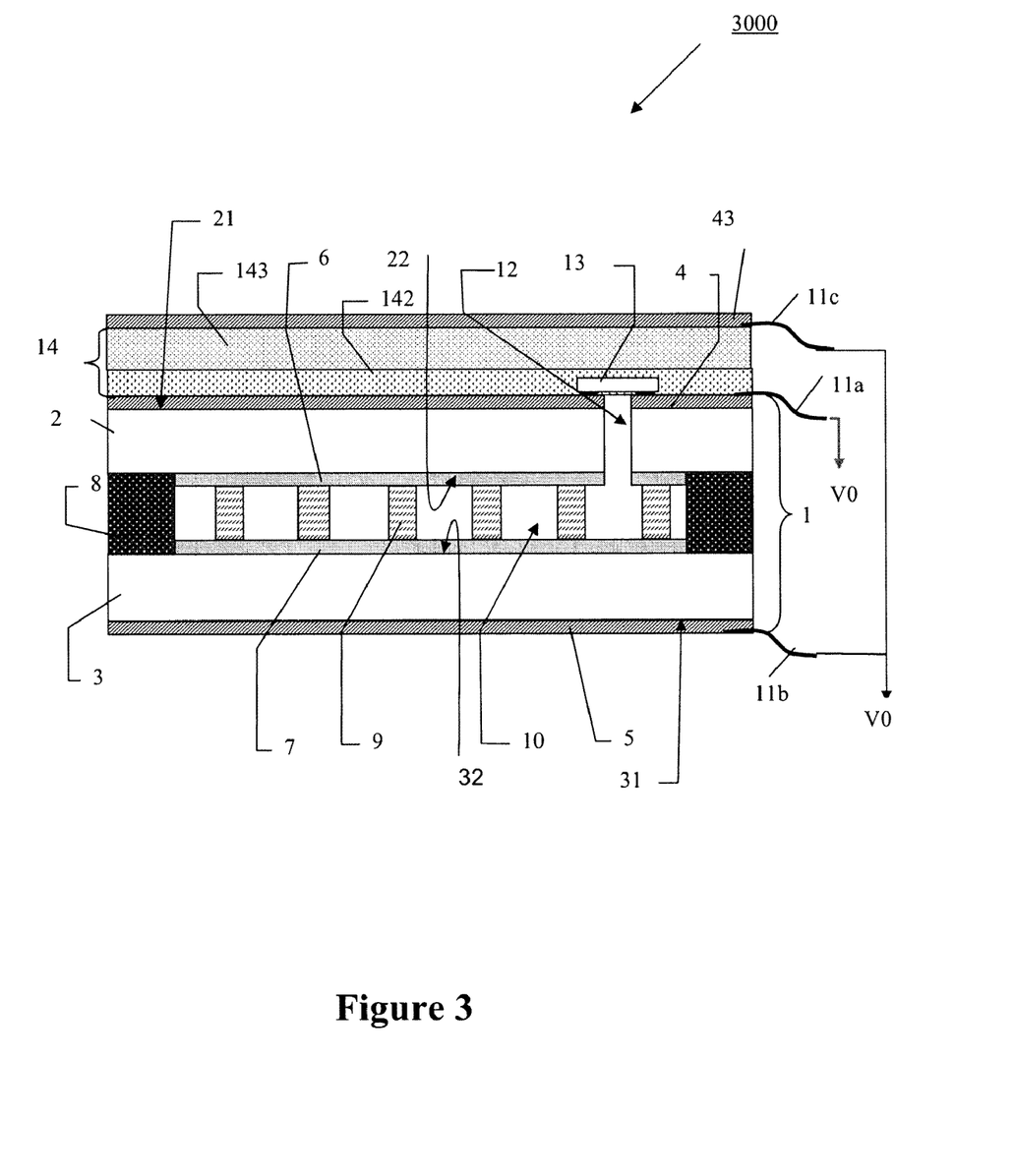

In the embodiment shown in FIG. 3, the structure 3000 of the lamp basically repeats the structure of FIG. 1 except for:
- the arrangement of the protective electrical conductor 43 covering the interlayer dielectric 14, it being furthermore possible for this conductor 43 also to be protected by an adhesive film, for example by a polyurethane and a polycarbonate;
- the dielectric 14 comprises an EVA sheet 142 of 1.6 mm thickness beneath a PC sheet 143 of 4 mm thickness; and
- the absence of a glass laminating counter-pane and a plastic interlayer film on top of the electrode 5.

Since the electrode 5 and the electrical conductor 43 are connected to an earth, the electrical conductor 43 is a screen. The voltage U across the terminals of the interlayer dielectric 14 is equal to $V_0$.

Figure 4:
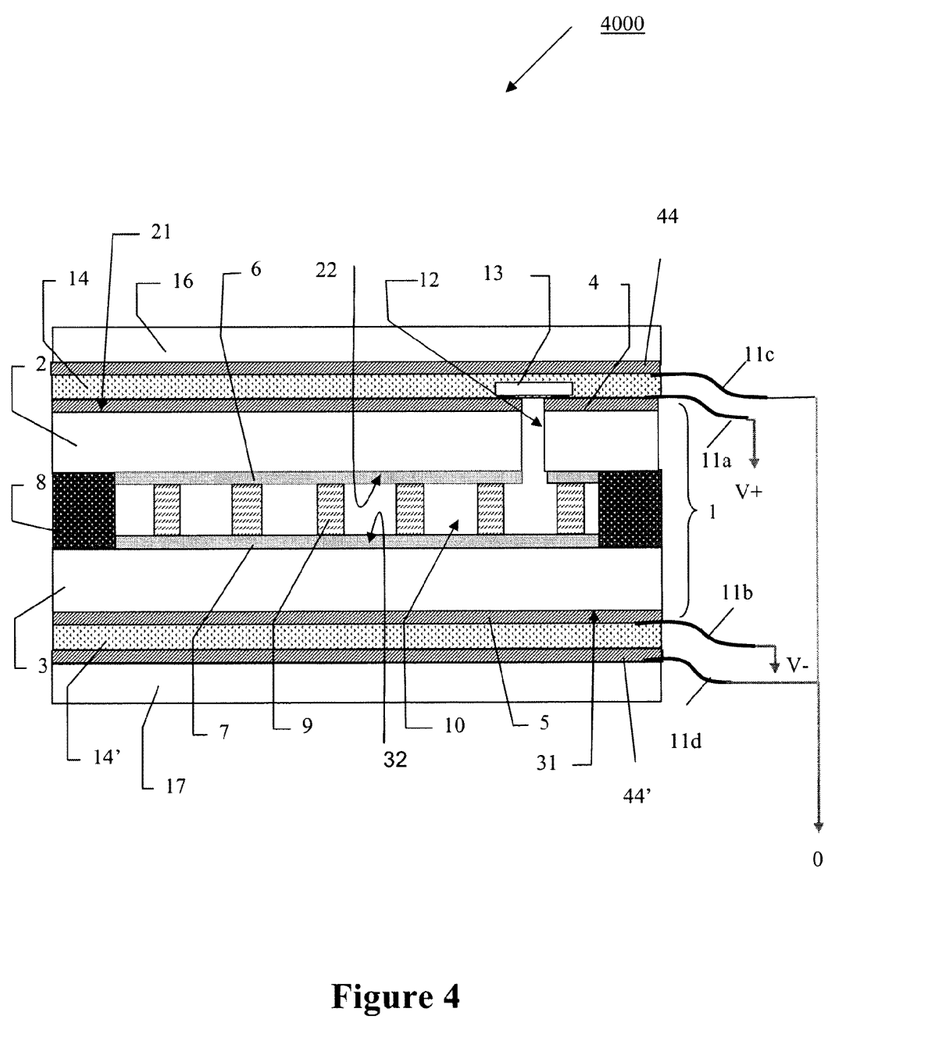

In the embodiment shown in FIG. 4, the structure 4000 of the lamp basically repeats the structure of FIG. 1 except for the electrode 4 which is at a potential V+ of around 300 V and the electrode 5 which is at a potential of opposite sign V− of around 700 V, for a frequency $f_0$ of 50 kHz. The structure also uses two protective electrical conductors 44, 44' in the form of continuous transparent electrically conducting layers. The two protective electrical conductors 44, 44' are connected to an earth of the circuit for supplying power to the lamp in order to avoid any leakage current.

The interlayer dielectric is then in two parts 14, 14', for example in the form of PVB sheets, each with a thickness for example of 2.5 mm, or in the form of the abovementioned other film variants. The consumed power $P_d$ corresponds to the sum of the powers at the terminals of the two parts 14, 14'. The voltages U at the terminals of the two parts 14, 14' of the interlayer dielectric are equal to V+ and V−.

Figure 5:
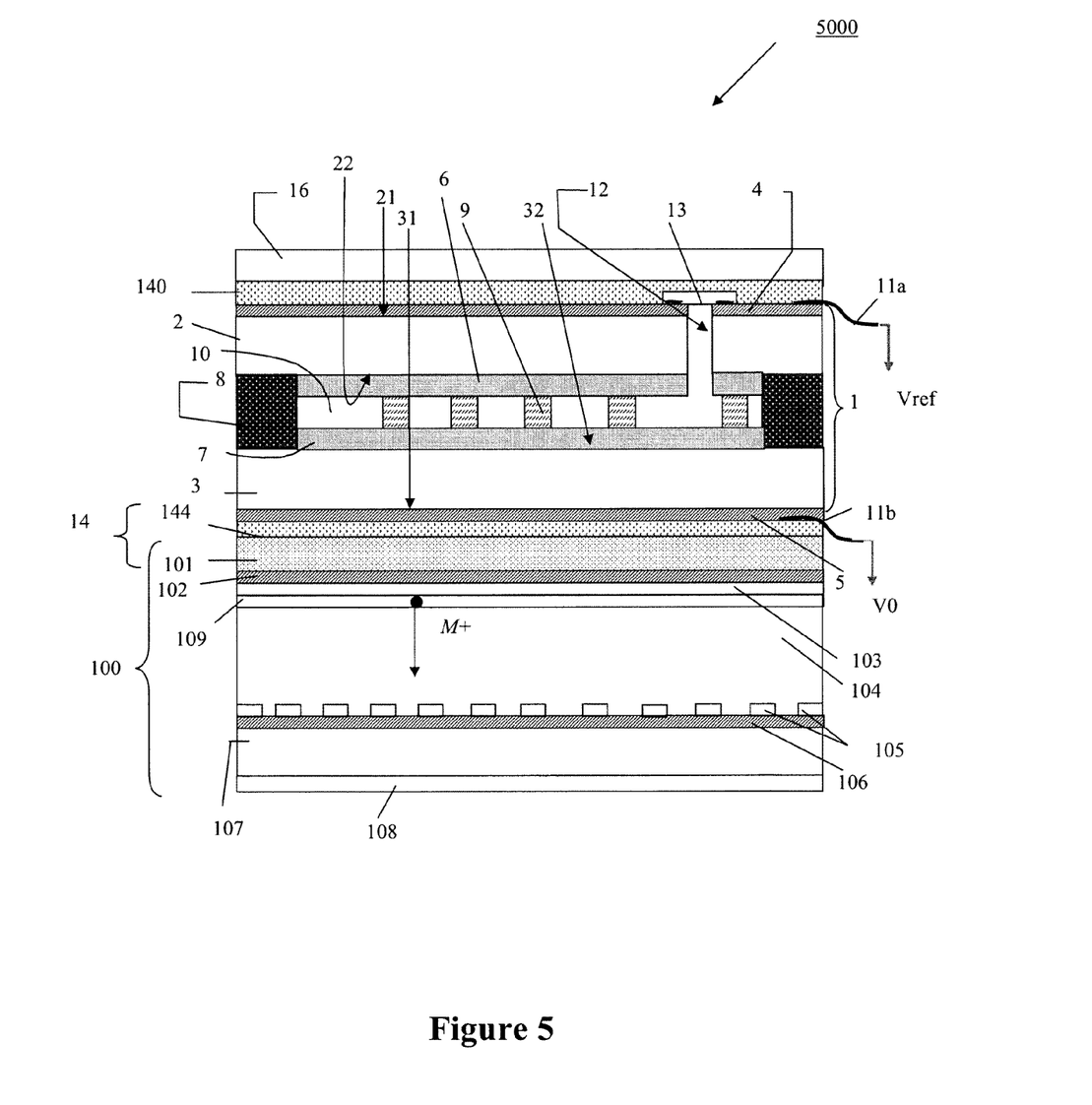

In the embodiment shown in FIG. 5, the structure 5000 of the lamp basically repeats the structure of FIG. 1.

The electrode 5 is at a potential $V_0$ of the order of 1 kV and at a high frequency $f_0$ of 40 to 50 kHz. The electrode 4 is at a potential $V_{ref}$ of around 220 V and at a frequency f of 50 Hz, and is laminated via a laminating interlayer 140.

Assembled beneath the electrode 5 is a reversible electrochemical mirror 100, which enhances the safety of the structure.

This reversible electrochemical mirror comprises, in succession:
- an interlayer dielectric 14 formed from an EVA film 144 and a PC film 101;
- a first electrode 102;
- first nucleation sites 103, for example made of platinum;
- an electrolyte 104, for example a mixture of AgI and LiBr in a γ-butyrolactone solvent;
- second nucleation sites 105, for example made of platinum;
- a second electrode 106;
- a transparent substrate, preferably a glass sheet 107 or, as a variant, a transparent plastic substrate or any flexible or rigid composite substrate; and
- optionally, a low-emissivity or solar-controlled layer 108.

The first nucleation sites 103 are close together, whereas the second nucleation sites 105 are far apart. Atoms M+ of a metallic material, preferably silver, are capable of forming, by electrodeposition, a reflecting surface 109 or semi-reflecting surface (intermediate state) on the first sites 103, or a substantially transparent surface (not shown), in the form of conducting islands, on the second sites 105.

Means (not shown) are provided for regulating the level or reflection of the reflecting surface, by adjusting the voltage, by measuring the amount of current or by measuring the electrical resistance.

Since the electrode 102 or 106 is connected to an earth (not shown), the leakage current on the electrode 5 side is therefore zero. The voltage U across the terminals of the interlayer dielectric 14 is equal to $V_0$-$V_{ref}$.

Figure 6:
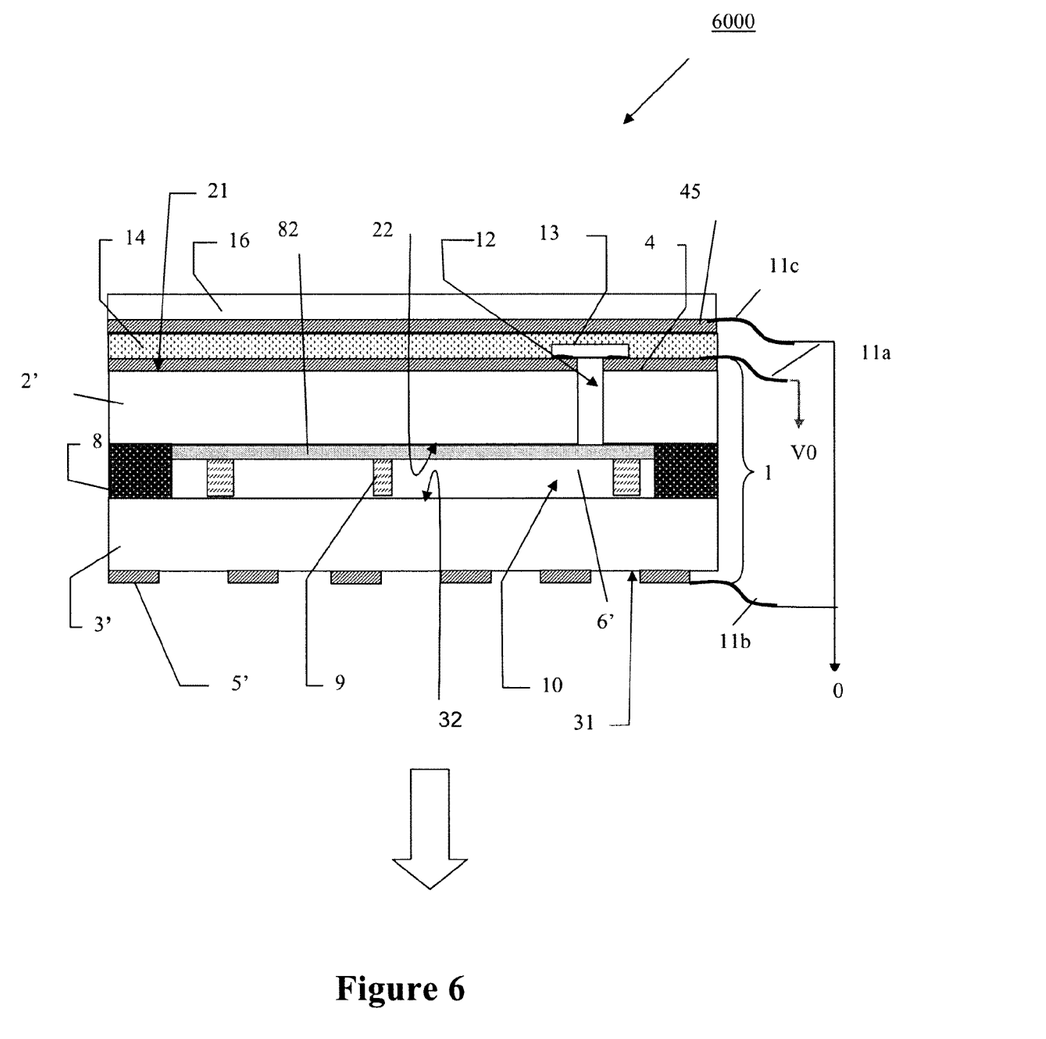

In the embodiment shown in FIG. 6, the structure 6000 of the lamp partly repeats the structure of FIG. 1 except that this is a UV lamp 6000 with a single emitting face 31 (the emission being symbolized by the broad arrow) with, as UV source, a plasma gas 6' in the internal space 10.

Since the walls 2', 3' are chosen to be UV-transparent, a UV reflector 82, for example made of alumina, is placed on the internal face of the wall 2'.

The electrode 5' is in the form of strips (or in the form of wires and/or a grid) in order to let through the UV radiation and, since it is not coated, it is connected to earth like the protective conductor 45. The voltage U across the terminals of the interlayer dielectric 14 is equal to $V_0$.

Figure 7:
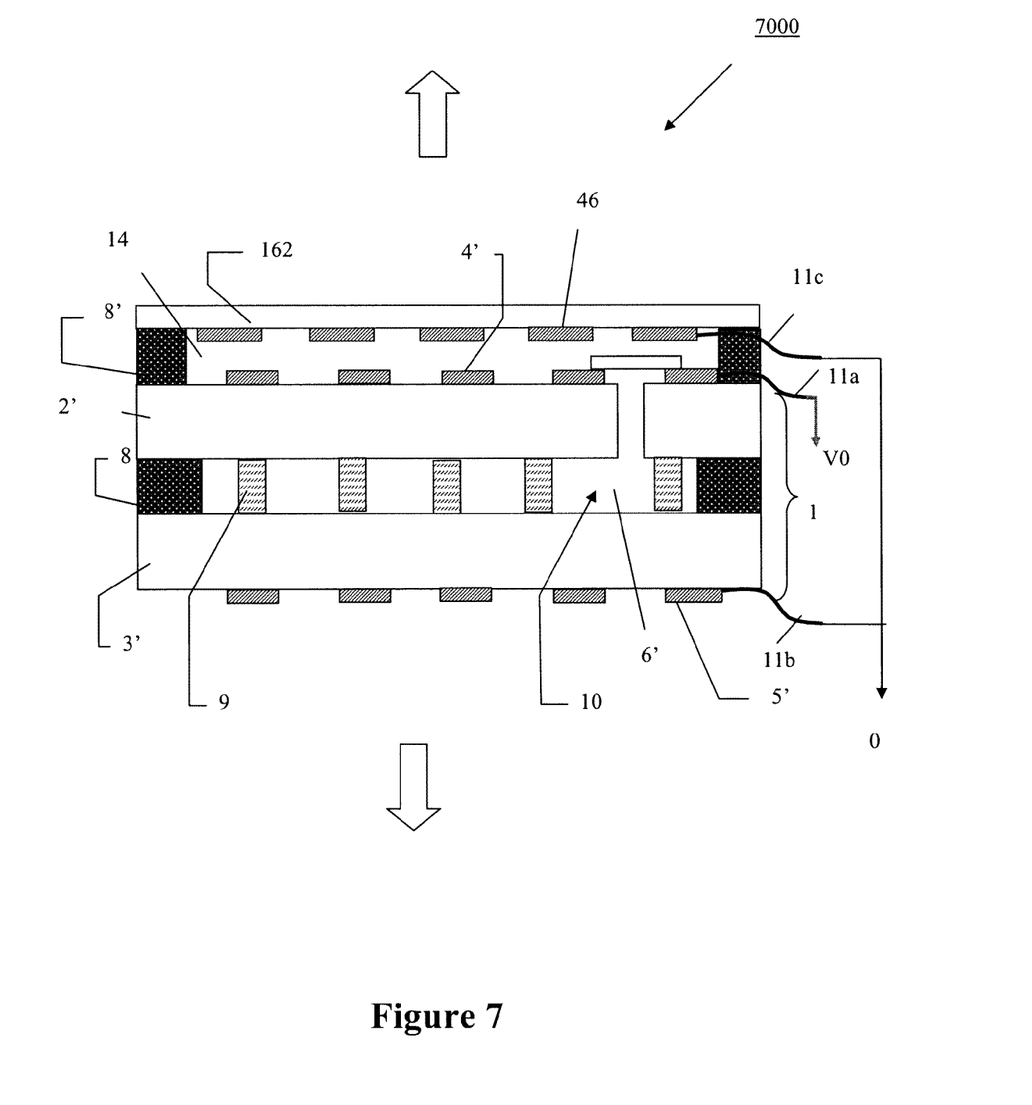

In the embodiment shown in FIG. 7, the structure 7000 of the lamp partly repeats the structure of FIG. 1 except that this is a UV lamp with two emitting faces (the emission being symbolized by the two broad arrows) having a plasma gas 6' as UV source in the internal space 10.

The walls 2', 3' are chosen to be UV-transparent, like the covering dielectric 162. The protective conductor 46 and the electrodes 4', 5' are for example in the form of strips (or in the form of wires and/or a grid) in order to let through the UV radiation, and the interlayer dielectric 14 is nitrogen with a peripheral seal 8'. The voltage U across the terminals of the interlayer dielectric 14 is equal to $V_0$.

The electrode 5', since it is not coated, is connected to earth like the protective conductor 46.

Figure 8:
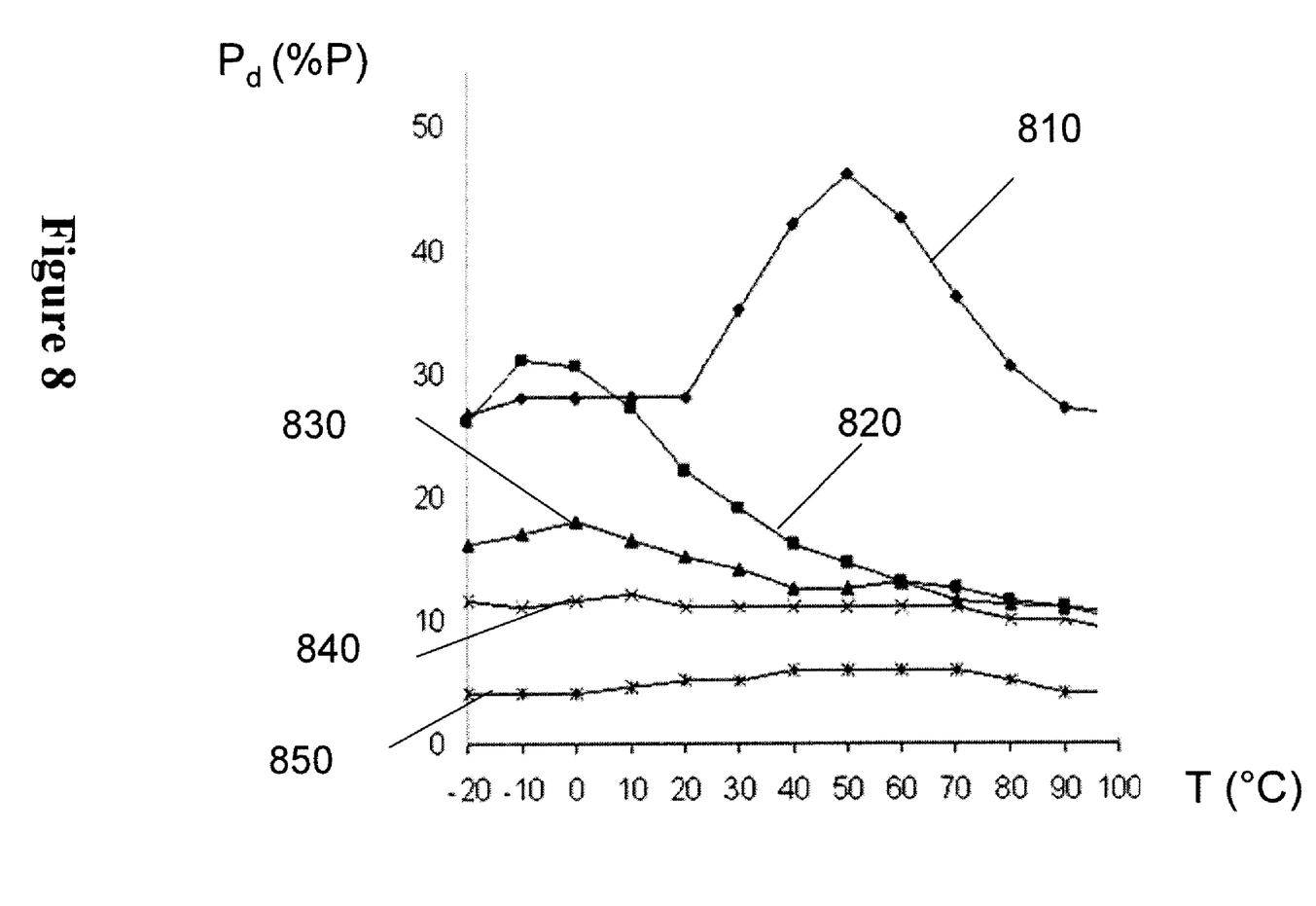
FIGS. 8 to 10 show, respectively, the variation in $P_d$, tan $\delta$ and electrical permittivity $\in_r$ as a function of the surface temperature of the structure.
Figure 9:
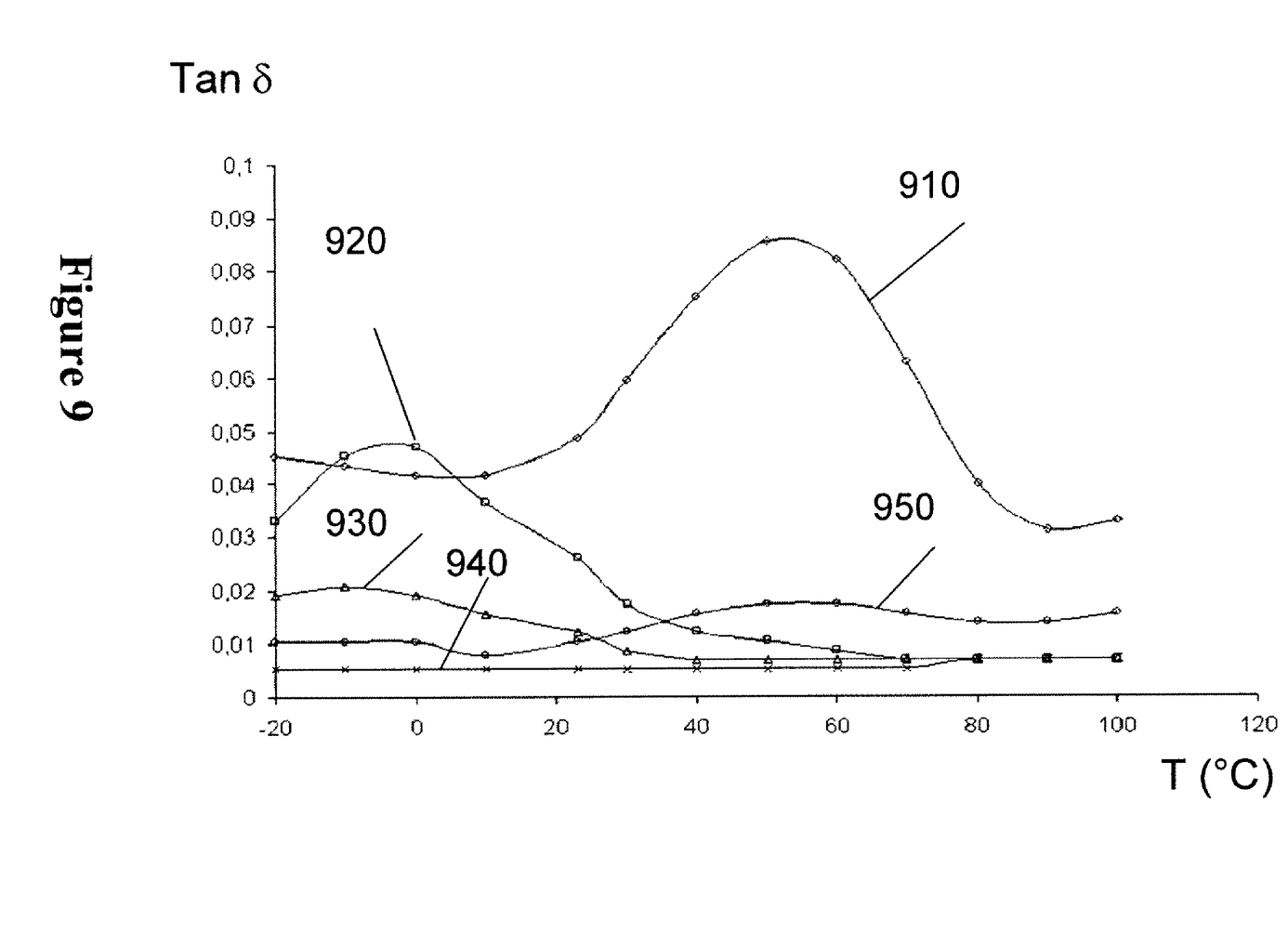
Figure 10:
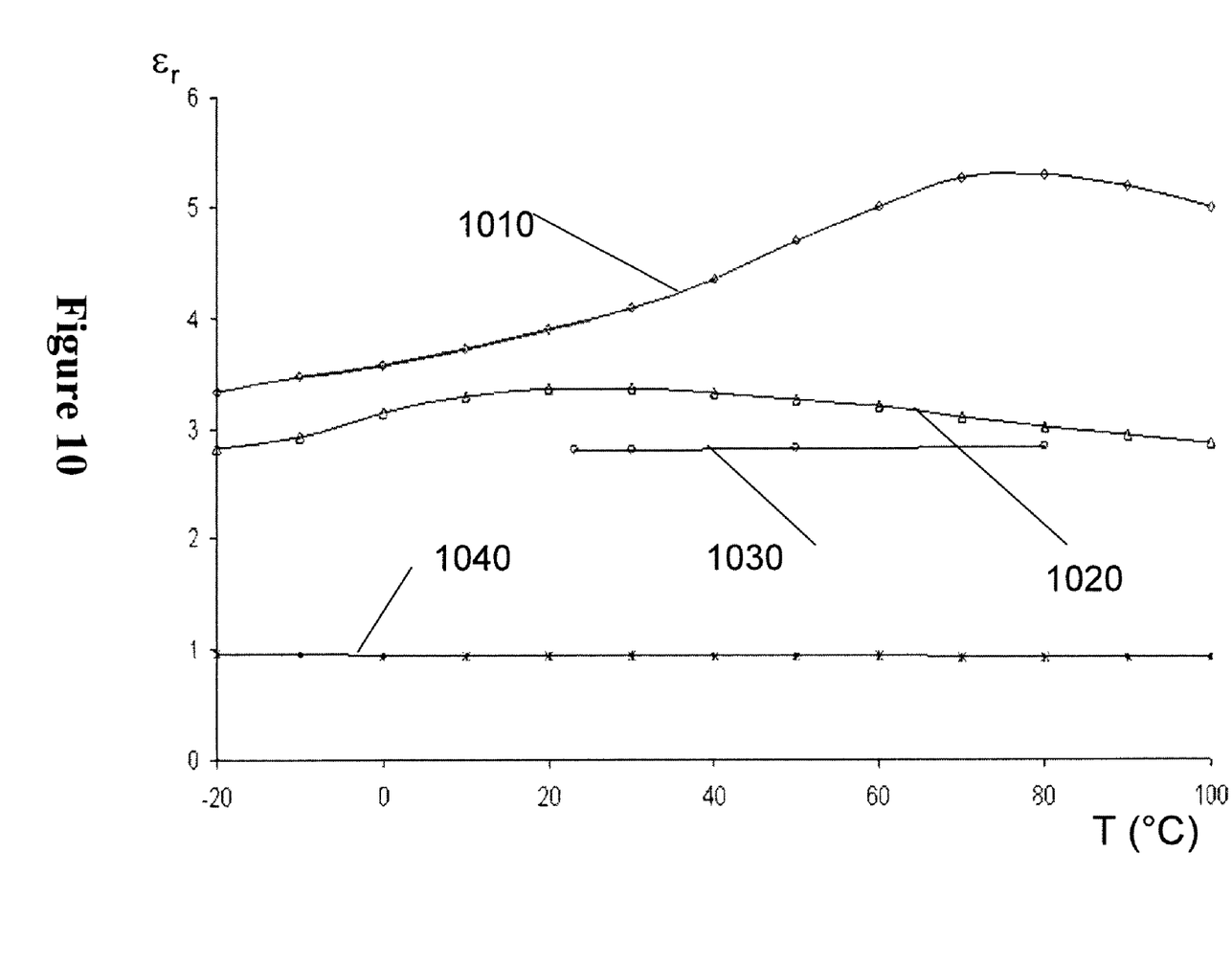

FIGS. 8 to 10 show, respectively:
the variation of $P_d$ (curves 810 to 850) as a function of the surface temperature of the structure 1000;
the variation of tan δ (curves 910 to 950) as a function of the surface temperature of the structure 1000; and
the variation of the electrical permittivity $\in_r$ (curves 1010 to 1040) as a function of the surface temperature of the structure 1000,
this being for the following interlayer dielectrics:
a PVB layer of 5 mm thickness (curves 810, 910, 1010);
an EVA layer of 3.8 mm thickness (curves 820, 920, 1020);
a single PC layer (curve 1030) or a PC layer combined with an EVA layer of 4 mm and 1.6 mm thickness respectively (curves 830, 930);
a single air layer of 4 mm thickness (curves 840, 940, 1040); and
an air layer of 2 mm thickness and 3.15 mm of glass (curves 850, 950).

It may be seen that EVA provides a better behaviour than PVB, especially above 30° C. when the consumed power $P_d$ lies between 10 and 20 W per 100 W.

The EVA/PC combination, which is even more advantageous, gives low consumed power $P_d$ which is relatively constant with temperature (ranging between 10 and 17 W per 100 W).

From an electrical standpoint, air and the air/glass combination are also advantageous owing to the low consumed power $P_d$ (less than 5 W per 100 W) and their great temperature stability. Even though the loss angle of the air/glass combination is relatively high, the power consumed at its terminals is low since the capacitance value is the lowest of the insulators tested.

The examples that have just been described in no way limit the invention.

All unsymmetrical arrangements and alternative forms of assembly are possible both in the case of the electrodes (choice of material, choice of shape, choice of arrangement on glass or on plastic, etc.) and in the case of the protective electrical conductor(s) (choice of material, choice of shape, choice of arrangement on glass or on plastic, etc.) or in the case of the interlayer dielectric(s) (choice of material(s), choice of thickness(es), choice of shape, especially continuous full-area or apertured configuration or discontinuous configuration, etc.).

The light-emitting structure 1000 to 5000 may form an integral part of a double-glazing limit, for example as a replacement for one of the glass panes of the unit. In this configuration, the electrical conductor may furthermore be on the remaining glass pane of the double-glazing unit.

In the case of activation by a plasma gas, a differentiated distribution of the photoluminescent material in certain zones makes it possible to convert the energy of the plasma into visible radiation only in the zones in question, so as to constitute luminous zones (which are themselves opaque or transparent depending on the nature of the photoluminescent material) and juxtaposed zones that are permanently transparent.

The luminous zone may also form an array of geometrical patterns (lines, dots, circles, squares or any other shape) and the spacing between patterns and/or the size of the patterns may be variable.

The walls may be of any shape—their outline may be polygonal, concave or convex, especially square or rectangular, or curved, with a constant or variable radius of curvature, especially round or oval.

The walls may be plane or bowed, preferably kept a constant distance apart.

The walls may be glass substrates having an optical effect, especially walls that are coloured, decorated, structured, scattering, etc.

The structure may be sealed by mineral means (for example a glass frit), by means of a substantially transparent material (glass, etc.) or with an adhesive (silicone).

The invention claimed is:

1. A light-emitting structure, the light-emitting structure emitting light in at least one of a visible spectrum and an ultraviolet (UV) spectrum, comprising:
    first and second dielectric walls with planar main faces facing each other and defining an internal space containing at least one of a visible light and a UV radiation source;
    first and second electrodes for at least one of the visible light and the UV radiation source, which generate electric field lines with at least one component perpendicular to the first and second electrodes, the first and second electrodes being associated with the first and second dielectric walls, respectively, the first electrode being supplied by a high-frequency electromagnetic signal of frequency $f_0$;
    an outer cover for the first electrode and that comprises an electrical protective conductor separated from the first electrode by an interlayer dielectric, the interlayer dielectric being substantially flat and having a capacitance C, the electrical protective conductor being connected to an electrical power supply with an adjustable potential V and with an adjustable frequency f, at least one of the potential and the frequency being adjusted so that a peak value of an external leakage current is equal to 2 mA or less when f is zero, or 0.7 mA and less when f is non-zero, and
    wherein at least one of the interlayer dielectric, the protective conductor, the first electrode, and the second electrode is chosen such that power consumed at terminals of the interlayer dielectric is equal to or less than 0.35 times the power, P, supplied by the electrical power supply, and such that the power $P_d$, at least at a surface temperature chosen between 25° C. and 60° C. being given by formula: $P_d = 2\pi f_0 CU^2 \sin \delta$ in which $\delta$ is a loss angle of the interlayer dielectric and U is the voltage across the terminals of the interlayer dielectric.

2. The light-emitting structure according to claim 1, wherein $P_d$ is equal to or less than 0.25 P for the surface temperature.

3. The light-emitting structure according to claim 1, wherein the interlayer dielectric has a tan $\delta$ equal to or less than 0.06 for the frequency $f_o$ between 1 and 100 kHz and at the surface temperature or wherein the interlayer dielectric has a relative permittivity $\in_r$ equal to or less than 4.5 for the frequency $f_0$ between 1 and 100 kHz at the surface temperature.

4. The light-emitting structure according to claim 1, wherein at least one of the first electrode, the second electrode, and the protective electrical conductor is in one of the following forms: a continuous layer, a discontinuous layer, a strip, a grid, and mutually parallel wires.

5. The light-emitting structure according to claim 1, wherein the interlayer dielectric comprises one of the following elements:
   a sheet of glass, or a sheet of glass forming one of the first and second dielectric walls and chosen from a soda-lime-silica glass with at least 0.05% $Fe^{III}$ or $Fe_2O_3$, a borosilicate glass, a silica or a quartz;
   a film of polymer chosen from a polyethylene terephthalate, a polyvinyl butyral, a polyurethane, a polyethylene, a polyethylene naphthalate, a polyvinyl chloride and a polymethyl methacrylate, each having a minimum thickness of 5 mm in a full-area configuration;
   an ethylene/vinyl acetate, having a minimum thickness of 3 mm in the full-area configuration, or a polycarbonate having a minimum thickness of 2 mm in the full-area configuration;
   air, with a minimum thickness of 1 mm, or an inert gas, or nitrogen, and/or with a minimum thickness of 2 mm;
   or a stack of at least one of element including:
   at least two polymer films, or an ethylene/vinyl acetate film and a polycarbonate film;
   a gas and at least one of the polymer films, or the polycarbonate film and the ethylene/vinyl acetate film;
   a gas and the glass sheet;
   at least one of a glass sheet with apertures or in discontinuous form, or in strip form and at least one of the polymer films.

6. The light-emitting structure according to claim 1, wherein the interlayer dielectric is substantially or completely transparent in at least one of the visible light spectrum the UV light spectrum.

7. The light-emitting structure according to claim 1, wherein at least one of the electrical protective conductor, the first electrode, and the second electrode is substantially or completely transparent at least one of the visible light spectrum the UV light spectrum.

8. The light-emitting structure according to claim 1, wherein the first and second electrodes are at least partly formed in the first and second dielectric walls or on external main faces of the first and second dielectric walls, the first and second dielectric walls being glass sheets.

9. The light-emitting structure according to claim 1, wherein the potential V is a group potential.

10. The light-emitting structure according to claim 1, wherein the electrodes are placed on external main faces of the first and second dielectric walls, and the outer cover includes another dielectric as a covering dielectric lying on top of the electrical protective conductor, and at least one of the potential V is 400 V or less and the frequency f is 100 Hz or less.

11. The light-emitting structure according to claim 1, wherein the second electrode is electrically connected to the protective electrical conductor.

12. The light-emitting structure according to claim 1, wherein the second electrode is supplied by a high-frequency electromagnetic signal,
   the flat or substantially flat light-emitting structure includes another electrical safety system associated with the second electrode, and
   the interlayer dielectric is made up of two parts each being external cover for one of the first and the second electrode, the power $P_d$ corresponding to the sum of the powers at the terminals of the two parts.

13. The light-emitting structure according to claim 1, wherein the outer cover is formed in one of an electrically controllable device and a device having variable optical properties.

14. The light-emitting structure according to claims 1, wherein the internal space contains at least one of a plasma gas emitting in at least one of the visible light spectrum and the UV light spectrum and a phosphor emitting in the visible light spectrum.

15. The light-emitting structure according to claim 1, further comprising a material that reflects at least one of visible light and UV radiation, partly or entirely covering an internal or external main face of one of the first and second dielectric walls, or alumina or aluminum, and/or forming one of the first and second electrodes.

16. The light-emitting structure according to claim 1, wherein the light-emitting structure is included in at least one of: a decorative element or architectural element, an element having a display function, luminaires, or flat luminaires, luminous walls, or suspended walls, luminous tiles, display screen backlighting, an illuminating window for buildings, or a locomotion device, or a train window or a ship or aircraft cabin window, a roof, side window, rear window or windscreen of industrial vehicles, a glazing, an internal partition between two rooms or between two compartments of land, an air or maritime locomotion device, a display case or shop window, urban furniture, a building façade, or in that the UV-emitting structure chosen serves for a beauty field, or a tanning lamp, a biomedical field, an electronics field or a food field, for decontaminating air, tap water, drinking water or swimming pool water, for UV drying or for UV curing.

17. The light-emitting structure according to claim 1, wherein the interlayer dielectric is selected to limit the capacitance C.

18. The light-emitting structure according to claim 2, wherein the surface temperature ranges between 30° C. and 60° C.

19. The light-emitting structure according to claim 3, wherein the surface temperature ranges between 30° C. and 60° C.

20. The light-emitting structure according to claim 10, wherein the potential V is 220 V or less.

* * * * *